United States Patent
Beebe

(10) Patent No.: US 8,352,089 B2
(45) Date of Patent: Jan. 8, 2013

(54) REMOTELY CONTROLLED FLUID DISPENSER

(75) Inventor: W. Scott Beebe, Berkley, MA (US)

(73) Assignee: Fishman Corporation, Hopkinton, MA (US)

( * ) Notice: Subject to any disclaimer, the term of this patent is extended or adjusted under 35 U.S.C. 154(b) by 235 days.

(21) Appl. No.: 12/751,380

(22) Filed: Mar. 31, 2010

(65) Prior Publication Data

US 2011/0245983 A1   Oct. 6, 2011

(51) Int. Cl.
*G05D 7/00* (2006.01)

(52) U.S. Cl. .................. 700/283; 700/3; 700/9; 700/19; 700/119

(58) Field of Classification Search .................. 700/282, 700/283, 3, 9, 19, 119; 705/26.14
See application file for complete search history.

(56) References Cited

U.S. PATENT DOCUMENTS

| | | | |
|---|---|---|---|
| 4,237,536 A | 12/1980 | Enelow et al. | |
| 5,505,777 A * | 4/1996 | Ciardella et al. | 118/663 |
| 5,630,527 A | 5/1997 | Beebe et al. | |
| 5,711,989 A | 1/1998 | Ciardella et al. | |
| 5,765,722 A | 6/1998 | Beebe et al. | |
| 6,259,956 B1 | 7/2001 | Myers et al. | |
| 6,567,710 B1 | 5/2003 | Boelkins | |
| 6,682,601 B1 | 1/2004 | Beebe | |
| 6,739,877 B2 | 5/2004 | Bailey et al. | |
| 6,823,270 B1 | 11/2004 | Roys | |
| 6,850,849 B1 | 2/2005 | Roys | |
| 6,918,771 B2 | 7/2005 | Arington et al. | |
| 7,013,894 B2 | 3/2006 | McFarland, Jr. | |
| 7,379,827 B1 | 5/2008 | Roys | |
| 7,603,289 B2 * | 10/2009 | Kriedler et al. | 705/7.35 |
| 7,720,574 B1 | 5/2010 | Roys | |
| 2003/0012081 A1 | 1/2003 | Jungmann et al. | |
| 2003/0028285 A1 | 2/2003 | Zura et al. | |
| 2003/0149505 A1 | 8/2003 | Mogensen | |
| 2005/0096796 A1 | 5/2005 | Filev | |
| 2005/0244569 A1 | 11/2005 | Estelle et al. | |
| 2006/0030953 A1 | 2/2006 | Cantrell et al. | |
| 2006/0206238 A1 | 9/2006 | Walker et al. | |

(Continued)

FOREIGN PATENT DOCUMENTS

WO    WO 01/43089 A1    6/2001

OTHER PUBLICATIONS

Beebe, W. Scott. "Fluid Dispensing System", U.S. Appl. No. 12/568,180, filed Sep. 28, 2009, 15 pages. Wikipedia "Web Conferencing," http://en.wikipedia.org/wiki/Web_conferencing, last accessed Apr. 28, 2011.
Office Action mailed May 6, 2011 in U.S. Appl. No. 12/835,796, entitled "Virtual Dispensing System," First named inventor: Beebe, W. Scott.

*Primary Examiner* — Carlos Ortiz Rodriguez
(74) *Attorney, Agent, or Firm* — Brian M. Dingman; Mirick, O'Connell, DeMallie & Lougee

(57) ABSTRACT

A network of fluid dispensers is configured such that a Host controller may exchange information with local dispensers, and where local dispensers may exchange information with each other. The information may be dispensing processes, information regarding quality and reliability, problems and/or helpful information, and applications. The information may be exchanged in real time during fluid dispensing where any issues may be shared and resolved quickly even in remote locales. The applications may be developed at a local dispenser or at the Host and then shared throughout the network. The operating systems may include application software development tools, and the applications may include: monitoring deliver schedules and materials inventories; automatic issuing of purchase orders; training broadcasts; implementing industry standards for validation and approval.

14 Claims, 3 Drawing Sheets

U.S. PATENT DOCUMENTS

| | | |
|---|---|---|
| 2007/0119859 A1 | 5/2007 | Harrell |
| 2007/0255451 A1 | 11/2007 | Lewis et al. |
| 2007/0265733 A1 | 11/2007 | Harrell |
| 2008/0061163 A1 | 3/2008 | Kubby et al. |
| 2008/0309665 A1* | 12/2008 | Gregory et al. ............... 345/420 |
| 2009/0240363 A1 | 9/2009 | Hughes |
| 2010/0075283 A1 | 3/2010 | Rees et al. |
| 2010/0228400 A1 | 9/2010 | Johnson et al. |
| 2011/0046772 A1 | 2/2011 | Healey et al. |

OTHER PUBLICATIONS

Invitation to Pay Additional Fees and, Where Applicable, Protest Fee (with Annex to Form PCT/ISA/206) mailed May 6, 2011 in PCT/US2011/000271, Applicant: Fishman Corporation.

International Search Report and Written Opinion of the International Searching Authority issued in corresponding application No. PCT/US11/00271.

* cited by examiner

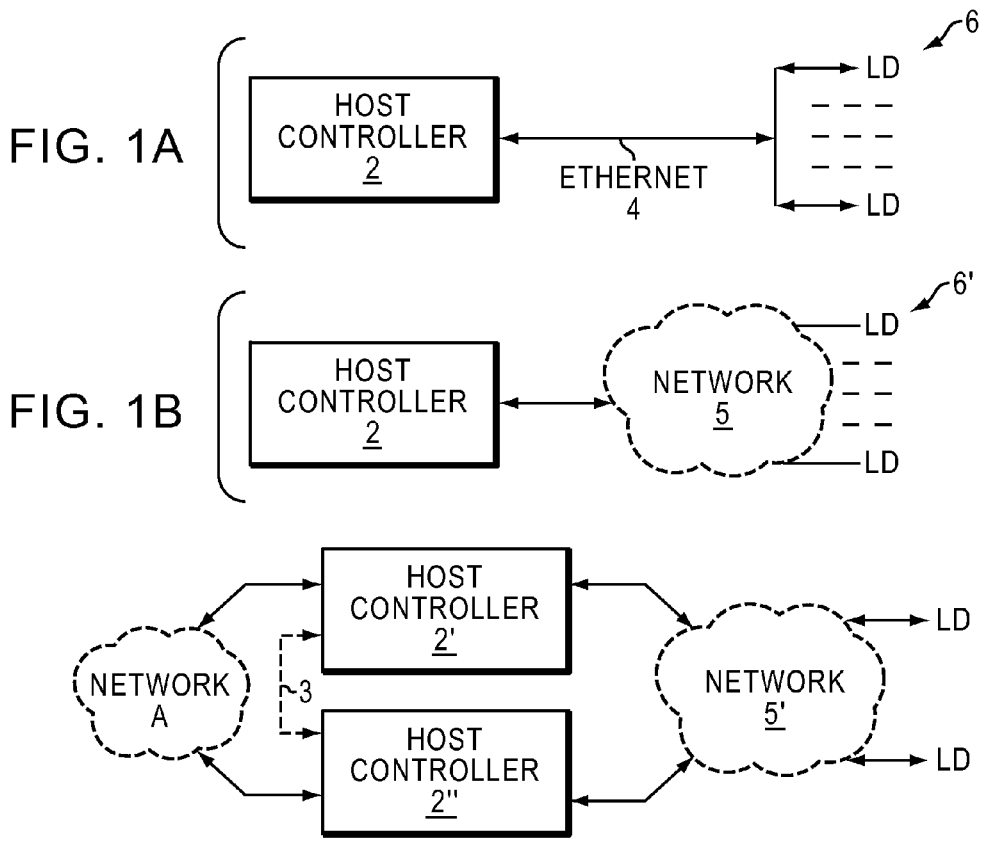
FIG. 1A
FIG. 1B
FIG. 1C
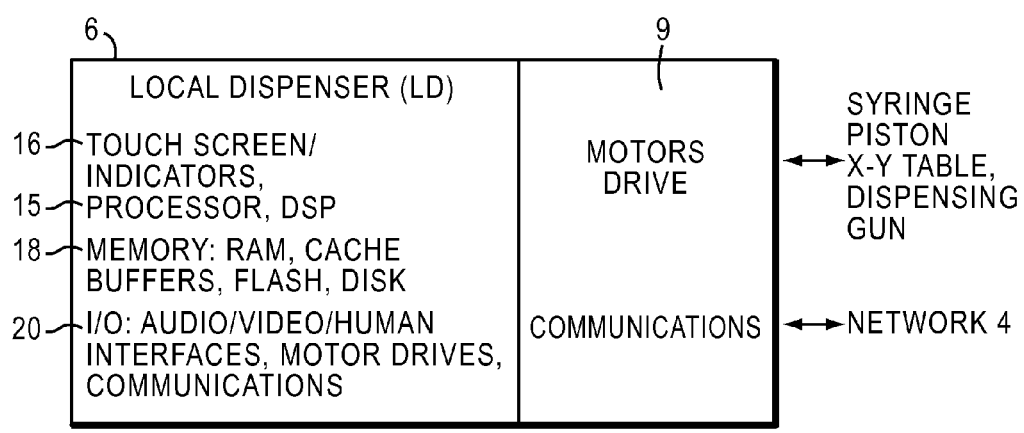
FIG. 2A

REMOTELY CONTROLLED FLUID DISPENSER

RELATED APPLICATIONS

The present application is related to a U.S. patent application Ser. No. 12/568,180 entitled FLUID DISPENSING SYSTEM, filed on Sep. 28, 2009 having the same inventor and ownership as the present application. The present application is also related to U.S. Pat. Nos. 5,630,527, 5,765,722 and 6,682,601, all of which have the same ownership as the present application. This earlier U.S. patent application and these three U.S. patents are hereby incorporated herein by reference.

FIELD OF THE INVENTION

The present invention is related to fluid dispensing methods and systems that are part of a network, and where each of the dispensers may be controlled by a remote Host computer system via the network. Herein "network" refers a communications network where the Host communicates with one or many dispensers that may be nearby or spread over a wide geographical range. "Network" may be the Internet (the Web or Cloud), but it may be a hardwired local area network or any wireless local area network. "Host" is discussed below as a single computing entity, but the "Host" may be distributed processors or multiple processors that could be at different locations or addresses on the network or on alternative networks.

BACKGROUND INFORMATION

Dispensing consistent, controllable, and accurate amounts of fluid of varying viscosities remains an issue for product manufacturers and suppliers. For example, for product manufacturing, it is important to reliably and accurately dispense adhesives to ensure high quality and structural integrity of the end product. Herein the end product may be virtually any assembly where adhesives are used to secure parts of structures together. The range of products is broad, e.g., airplane assemblies to audio systems, furniture, housings, packaging, etc.

In instances where dispensers are distributed at widely diverse geographic locations, quality control of the end product may be difficult. For example, control of diverse fluid adhesives having widely diverse viscosities and with no post dispensing dripping is no easy task. Uniform, high quality, world wide dispensing is an important competitive advantage.

In dispensing adhesives and like fluids, the term "dot" or "bead" refers to the form factor of a quantity of fluid dispensed and "fluid" refers to liquids or suspensions or other such materials that react as do materials that fit the common definition of a fluid e.g., water. "Dot" refers to a single, stand alone quantity of fluid, while "bead" refers to a continuous, dispensed strand of fluid. In each case the quantity dispensed is important. For example when a bead is being dispensed in a curved strand the dispenser must accommodate the dynamic differences compared to a straight line dispensing in order to have a uniform bead.

The location of the dot or bead being dispensed on the work piece relies on positioning equipment that controls the X-Y position of a work piece or manual abilities with a dispensing gun that are well known in the art and will only be incidentally referenced herein.

Production facilities using adhesive dispensers are being locally established world wide in many technical fields. Having widely spread dispensers, each individually operated with little knowledge of their operations may result in uneven quality and competitive disadvantages. Regardless of geographic location, precise (repeatable) and accurate dispensing of adhesives is crucial to the assembly of the products. For example, the quality of dispensing adhesives in Mexico and dispensing in the U.S., or anywhere else in the world, should all be high quality.

SUMMARY OF THE INVENTION

The present invention discloses a system for remotely controlling one or many fluid dispensers that may be locally distributed over a network or may be widely distributed over the world. Each dispenser may receive via a communications channel the necessary information to carry out a dispensing operation in real time. A Host at a location removed (in the next room or the next country) from the dispensers may download and upload software to and from each dispenser, and the dispensers may transfer information with each other. The uploaded information from a dispenser may include the "status." Status refers to, inter alia, the Host monitoring the operations at various steps along the dispensing process for all the local dispensers. The monitoring may include video and audio interchange between the Host and the specific dispenser in real time. For example, a picture of a dot or bead may be sent to the Host for evaluation, and the Host may measure the accuracy of the dot or bead dispensed, by, for example, comparing the video of the dot or bead to a model, or a template of the dot or bead. There may be mechanical alignment and positioning details that the Host may monitor. The Host may activate an audible or visual alarm to signal the local personnel that their attention may be needed.

In one application the dispensers may be distributed throughout a large manufacturing or a commercial facility, but in another application the dispensers may be in different countries on different continents. Any issue (positive or negative) found at one facility or at one dispenser may be made known to the other facilities and dispensers immediately. Any operation taken in response to an issue also will be available to the other locations within seconds. This coordinating may have special application where manufacturing standards must be met regardless of where the manufacturing or use occurs.

A dispensing process, moreover, may be developed at one location or at the Host and be downloaded to local dispensers as part of a training session. The process may be tested in real time. In order to develop processes and other related applications, for example, open sourcing of tools for developing applications may be available at the Host or at a local dispenser. A user may develop applications that may be made available world wide. In such a case any issues, especially any local issues at one facility, may be quickly found and resolved in real time.

Related applications may include the ability to share dispensing processes and special reporting and/or monitoring applications directly between local dispensers and/or a Host. Additionally, information "Webinars" may be developed and made available to dispensing locations and/or to any site on the network for training. The Webinars may also be directed to and helpful for manufacturing, marketing, sales, purchasing and inventory support.

Monitoring may include production schedules and projections, including materials needed, and matching orders to production dates. Discrepancies discovered may result in warnings that may require local personnel attention.

For devices that are manufactured as meeting some industry standard criteria for validation or approval, it may be possible to build a secure remotely controlled network of systems and an application that would allow validation at many locations at the same time. This would vastly improve the efficiency of any such operation, and such would save time and costs.

In commercial operations, central Host coordinating manufacturing at different locations may provide more consistent, quicker and more efficient operations.

BRIEF DESCRIPTION OF THE DRAWINGS

The invention description below refers to the accompanying drawings, of which:

FIGS. 1A, 1B and 1C are block diagram of a Host dispenser controller in communication with many local dispensers via a network;

FIG. 2A is a block diagram of a local dispenser;

DETAILED DESCRIPTION OF AN ILLUSTRATIVE EMBODIMENT

Figure 2B:
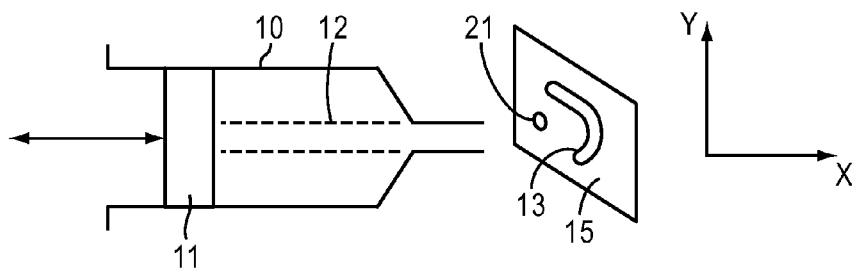
FIG. 2B is a detail illustrating a syringe dispensing a bead onto a work piece.

FIG. 1A illustrates several networked arrangements of a Host 2 controlling a number of LDs 6 (local dispensers) configured on a bussed Ethernet network 4. In addition to the bussed Ethernet 4, a daisy chain, ring or star type networks may be employed. FIG. 1B illustrates a configuration where the Host 2 communicates with the LDs 6' via a network 5. In this instance the network 5 may be wireless, e.g., WIFI, Bluetooth or virtually any communications network. FIG. 1C illustrates a system where the Host is distributed, where Host 2' communicates with Host 2" via the network 5', network A, or directly 3.

The networks may be hardwired, wireless or combinations of both.

Communications among devices communicating via any network include a two way link with a known protocol. Briefly, the Host and each LC must establish a communication link between the devices, and the meanings (protocol) of the bits transferred between the two must be understood by both. The actual link type and protocol are what distinguishes the different networks listed above, but virtually any network may be employed by the present invention, and, as such, the network and the protocol are ancillary to the present disclosure and will not be discussed further unless germane to a particular issue being discussed.

FIG. 2A illustrates the local controller 6 that may include a human interface 16 for inputting commands and displaying status, information, etc. For example, a touch screen, a keypad or full keyboard may be used. Other indicators, e.g. LEDs, may be housed in the controller, along with a microprocessor or DSP (Digital Signal Processor) 15 or their equivalents, e.g., gate arrays, etc. Memory 18 may include buffers, cache and main memory containing executable code. Mass or disk memory may be found in some applications, and in some applications flash memory may be used and may contain the dispensing and application software that is uploaded and executed from the main memory. In such a case the flash may be removed where, as a software protection technique, no system software remains in the controller 6. Other I/O 20 may include audio, visual, motor drives for syringe and/or gun dispensers and X-Y tables and communications to local dispensers. The communications allows the Host 2 to actively monitor the status and operations of the dispensers 6, and to transfer new or updated software and information via the network 4.

FIGS. 2A and 2B depicts a single local dispenser LD 6 with a motor 9 driven syringe 10, piston 11 and an X-Y table (or a hand gun dispenser). The operations to ensure the location and movement of the work piece mounted to the X-Y table and the dot or bead dispensing are well discussed in the incorporated application and U.S. patents listed above. The motors may position the work piece and the bead size as determined by motor drive software found in the local dispenser 6. In this application, a syringe 10 dispenses a fluid 12 as a bead 13 continuously as the X-Y table moves the work piece. In one application the fluid 12 may be adhesives dispensed as a dot 21 on the work piece 15. In such applications, a series of spaced adhesive dots and/or a bead are dispensed onto a work piece that is pressed to another work piece (not shown) to form a secure assembly.

Typically dot/bead size is critical to the application. In commercial applications, too little or too much fluid, or a non-uniform bead will adversely affect the quality of the final assembly. Moreover, post application dripping may adversely affect the appearance and the acceptability of the final product.

The operation of the physical dispensing precise and accurate fluids and control of the dispensing, back pressure, back off, etc. is illustrated in the incorporated U.S. patents and application.

In some applications the dispenser may dispense a fluid (not an adhesive) into vial, and the equivalent back off process may be developed for each quantity and type of fluid being dispensed. Here again, a back off process may be developed so that the meniscus is retained at the needle aperture after each amount of fluid is dispensed. When changes to the amount dispensed, the amount remaining in the syringe, the fluid type (wherein the viscosity, surface tension and other physical properties of the fluid change) occurs the dispensing process and the associated numbers may all change. In each case the numbers may be determined heuristically for each application. Again refer to the incorporated by reference U.S. patents and the application for more detail.

Figure 3:
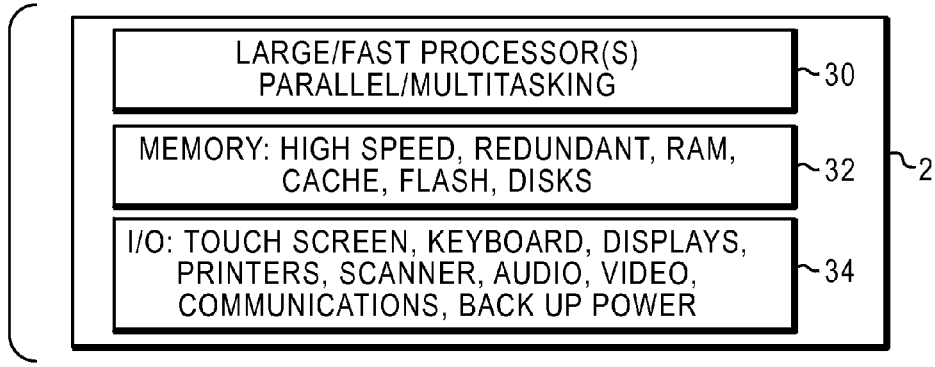
FIG. 3 is a block diagram of Host.

The Host controller 2 is illustrated in FIG. 3. The Host will have much the same categories of hardware and software as found in the LDs, but on a much larger scale. The Host 2 must serve and control many LDs over a wide geographical expanse in real time. As mentioned above the Host may be multiple processors working cooperatively and the processors may be at different locations with respect to the network.

The Host 2 may have a large, high speed processor system 30 capable of high speed control of possibly thousands of LDs in real time. The processor may be selected from manufacturers of the large computers and server systems, e.g. IBM. High speed memory 32 may include large RAM systems, buffers, caches, flash and redundant disk systems made by IBM, EMC, Network Appliances, etc. The I/O 34 may include the usual touch screens, keyboards, indicators (LEDs) printers, scanners, video and audio hardware, and high speed encrypted communications.

Figure 4:
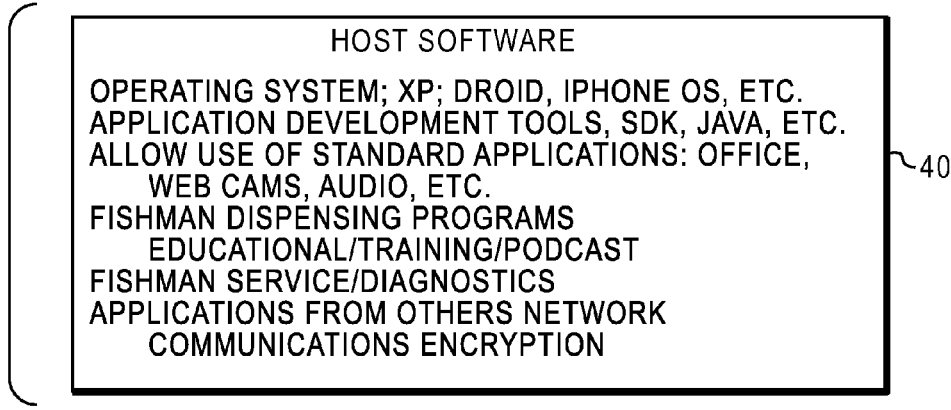
FIG. 4 is a listing of software resident in a Host.

The Host software 40 is listed in FIG. 4 and includes an operating system suitable for communicating with the operating system in the LDs. The operating system preferably is open sourced and/or has tools to accommodate writing and refining applications. For example the ANDROID (or DROID) operating system for mobile systems in based on LINUX and allows JAVA to be used to write applications (commonly referred to as "apps"). iPHONE operating systems include an SDK (Software Developers Kit) that also accommodates writing apps. XP and similar operating systems typically will support programs that accommodate writing applications.

Other applications may include dispensing programs, diagnostics and service programs, teaching/training programs, encryption programs and programs meant to implement, adhere to and test to quality industry standards.

Figure 5:
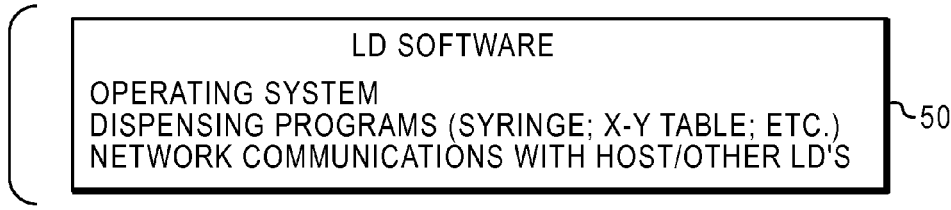
FIG. 5 illustrates the software resident in a local dispenser.

The software 50 resident in the LDs as shown in FIG. 5 cooperatively exchanges communications with the Host. The dispensing programs may be downloaded from the Host and executed in the LDs.

As mentioned above, a dispensing process may be developed heuristically for particular applications at a local dispenser or at the Host. For example, for a particular fluid in a particular application, the number of stepping motor steps to dispense the required dot or bead and then the number back off steps to prevent dripping as the syringe is depleted may be developed at one LD location. Once developed, the process may be up loaded to the Host and then down loaded to dispensers anywhere in the world. The process may be tested at each location to ensure quality and reliability. Part of the testing at each location, may entail a video showing the dot and/or bead that is sent to the Host. The Host may verify proper operation at the various locations. Voice communications may be used redundantly ensure proper operation with local personnel. In other applications one LD may be arranged to communicate with another LD and transfer a dispensing program.

Figure 6:
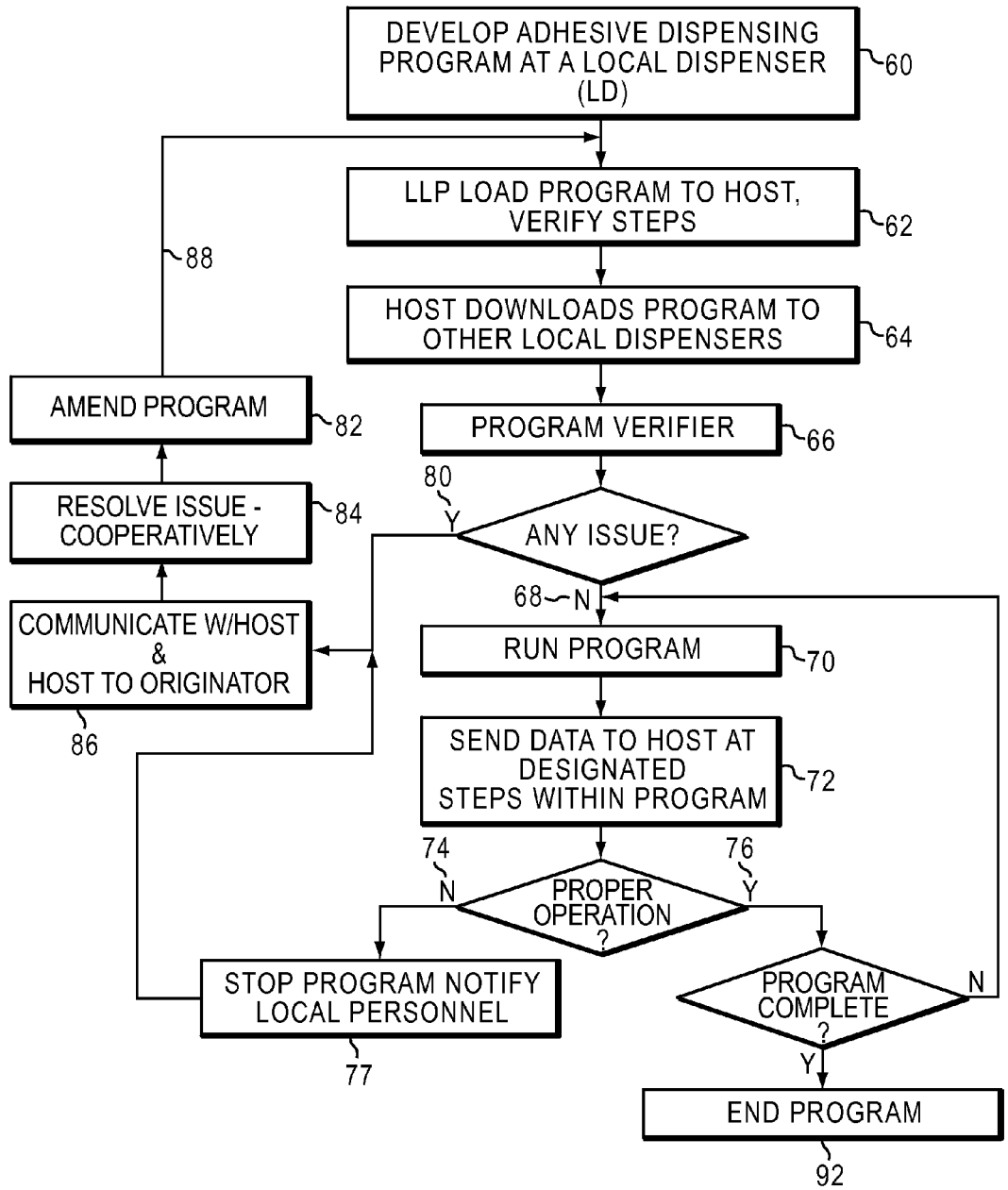
FIG. 6 is a flow chart illustrating one operation between a Host and a local dispenser.

FIG. 6 illustrates one operation of networked dispensers. Here a particular adhesive dispensing program 60 is developed at a local dispenser for a particular assembly. When completed that program is uploaded 62 to the Host. The Host may download 64 the program to other local dispensers that are assembly the same product using the same dispensing program. The local dispenser that received the down loaded program may verify 66 that the program works properly. If there is an issue 80, it is communicated to the Host 86, which may send the issue to the originator of the program. The issued may be resolved 84 cooperatively among the participants, the program amended 82 and uploaded 88 to the Host. If no issues are found 68 when the program is verified, the program is run 70 and product assembled. As the program steps are performed data may be sent to the Host 72 are pre-designated steps. The data may include video, or indicators of some other malfunction (like improper motor steps or dripping, etc.), if the operation is proper 76 the program runs until completion and ends 92. If some improper 74 or unexpected issue occurs, the program may be stopped 77 and the local personnel notified. The Host may then communicate the issue to the originator 86. The issue then will be resolved 84, the program amended 82 and up-loaded to the Host for down loading to the other local dispensers.

Advantageously, the Host and more than one local dispenser may cooperate on developing a dispensing program. Real time communication among the local dispensers and the Host allows for multiple designers to uncovered problems or other issues and resolve them quickly. Differences in locale, materials and operating personnel may be more quickly uncovered and resolved.

What is claimed is:

1. A fluid dispenser network comprising:
   a Host in communication with each of one or more dispensers via the network;
   the Host comprising: a processor, memory, a user interface, video and audio hardware, communications hardware; an operating system, a software application program that details operational steps particular to a dispensing application; and wherein
   the one or more dispensers comprising a processor, memory, a user interface, communications hardware; a software program to communicate with the Host, wherein the Host downloads the software application program to the one or more dispensers via the network that configures the one or more dispensers to determine a dot size for a given adhesive fluid, and determine stepping motor steps for dispensing that dot size and back off steps for maintaining that dot size as a function of quantity of the given adhesive fluid in a syringe;
   running the software application program at the one or more dispensers to provide the dot size for a given adhesive fluid, provide stepping motor steps for dispensing that dot size and back off steps for maintaining that dot size as a function of quantity of the given adhesive fluid in the syringe, and provide pausing locations at designated steps in the software application program;
   reaching a step in the software application program at the one or more dispensers where the dispensing is paused and developing a status of the one or more dispensers and feed back the status to the Host; and
   reviewing the status by the Host and, if acceptable, commanding the one or more dispensers to continue, but, if not acceptable, the Host commands the one or more dispensers to halt and notify local personnel.

2. The fluid dispenser network of claim 1 wherein the feed back to the Host occurs in real time.

3. The fluid dispenser network of claim 1 further comprising:
   a training program developed at the Host or at the one or more dispensers, wherein the training program may be accessed by the one or more dispensers over the network and at other sites connected to the network.

4. The fluid dispenser network of claim 1 further comprising:
   tools for developing software, wherein the tools are made available at the Host and at the one or more dispensers; and
   applications developed by the tools.

5. The fluid dispenser network of claim 4 wherein one application is directed towards ensuring that the dispensers operates to meet a standard.

6. The fluid dispenser network of claim 5 wherein the standard may be validated for dispensers at different locations.

7. The fluid dispenser network of claim 4 wherein one application comprises a Webinar.

8. The fluid dispenser network of claim 1 wherein the Host comprises a dispenser.

9. A process for remotely controlling one or more fluid dispensers, the process comprising the steps of:
   developing an adhesive dispensing program, the program including the steps of determining a dot size for a given adhesive fluid, and determining stepping motor steps for dispensing that dot size and back off steps for maintaining that dot size as a function of quantity of the given adhesive fluid in a syringe, and determining pausing locations at designated steps in the program;

uploading the program to a Host via network;
downloading of the program to the one or more fluid dispensers;
running the program at the one or more fluid dispensers to provide the dot size for the given adhesive fluid, provide stepping motor steps for dispensing that dot size and back off steps for maintaining that dot size as a function of quantity of the given adhesive fluid in the syringe, and provide pausing locations at designated steps in the program;
reaching a step in the program where the dispensing is paused and developing a status of the one or more fluid dispensers and communicating the status to the Host;
reviewing the status and, if acceptable, commanding the one or more fluid dispensers to continue, but, if not acceptable, the Host commands the one or more fluid dispensers to halt and notify local personnel.

10. The process of claim 9 further comprising the steps of sending the status to an original developer of the program; developing a solution to the unacceptable status; and relaying that solution to the one or more fluid dispensers via the Host.

11. The process of claim 9 wherein the host compares the status to a standard to determine if the dispensing is acceptable or not.

12. The process of claim 9, wherein:
developing the adhesive dispensing program comprises developing the adhesive dispensing program at a dispenser of the one or more dispensers
uploading the program to a Host via network comprises uploading the program from the dispenser of the one or more dispensers to the Host via network; and
downloading of the program to the one or more fluid dispensers comprises downloading the program from the Host to the remaining fluid dispensers of the remainder of the one or more fluid dispensers.

13. The process of claim 9, wherein reviewing the status further comprises reporting, by the Host, the status of a fluid dispenser of the one or more fluid dispensers to the remaining fluid dispensers of the one or more fluid dispensers.

14. A dispenser of a fluid dispenser network, the dispenser comprising:
communications hardware; and
a processor disposed in electrical communication with the communications hardware, the processor configured to:
receive instruction from a Host via the communications hardware to determine a dot size for a given adhesive fluid via the communications hardware, determine stepping motor steps for dispensing that dot size and back off steps for maintaining that dot size as a function of quantity of the given adhesive fluid in a syringe, and provide pausing locations at designated steps in the instructions;
execute the instructions to provide the dot size for the given adhesive fluid, provide stepping motor steps for dispensing that dot size and back off steps for maintaining that dot size as a function of quantity of adhesive fluid in the syringe, and provide pausing locations at designated steps in the instructions;
reach a step in the instructions where the dispensing is paused to develop a status of the dispenser and communicate the status to the Host via the communications hardware; and
receive a command from the Host via the communications hardware based upon the status as reviewed by the Host, the command one of commanding the dispenser to continue or commanding the dispensers to halt.

* * * * *